United States Patent [19]

Klausing

[11] Patent Number: 5,392,047

[45] Date of Patent: * Feb. 21, 1995

[54] RADAR DEVICE COMPRISING A SYNTHETIC APERTURE ON THE BASIS OF ROTATING ANTENNAS

[75] Inventor: Helmut Klausing, Bad Aibling, Germany

[73] Assignee: Deutsch Aerospace AG, Munich, Germany

[ * ] Notice: The portion of the term of this patent subsequent to Jan. 3, 2012 has been disclaimed.

[21] Appl. No.: 162,692

[22] Filed: Dec. 7, 1993

[30] Foreign Application Priority Data

Dec. 16, 1992 [DE] Germany .................. 4242532.8

[51] Int. Cl.⁶ .................... G01S 13/90; G01S 7/40
[52] U.S. Cl. ........................ 342/25; 342/174; 342/159
[58] Field of Search ............... 342/25, 89, 159, 161, 342/174

[56] References Cited

U.S. PATENT DOCUMENTS 3,611,376 10/1971 Gutleber .
4,638,315 1/1987 Raven .................................. 342/5
4,737,788 4/1988 Kennedy ............................. 342/29
5,017,922 5/1991 Klausing et al. .................... 342/25

FOREIGN PATENT DOCUMENTS 3922086 10/1990 Germany .

OTHER PUBLICATIONS

"Realisierbarkeit eines Radars mit synthetischer Apertur durch rotierende Antennen" (Implementability of a Radar Device Comprising a Synthetic Aperture by Means of Rotating Antennas) by Dr.-Ing. Helmut Klausing, MBB-Publication, MBB-UA-1150-89-Pub-=OTN-029299, 1989.

Primary Examiner—John B. Sotomayor
Attorney, Agent, or Firm—Evenson, McKeown, Edwards & Lenahan

[57] ABSTRACT

In the case of a ROSAR-device, a comparator module in which imaging defects are determined is provided for increasing and estimating the resolution precision in the processor circuit. This comparator module acts upon a further module for correcting the range curvature deviation so that imaging defects will be corrected.

12 Claims, 7 Drawing Sheets

FIG. 2 COMPLETE CALCULATION OF ANGLE OF ROTATION

RADAR DEVICE COMPRISING A SYNTHETIC APERTURE ON THE BASIS OF ROTATING ANTENNAS

BACKGROUND AND SUMMARY OF THE INVENTION

The present invention relates to the field of synthetic aperture radar (SAR), and in particular to a signal processing apparatus for a SAR system having a rotating antenna.

German Patent document DE-PS 39 22 086 and the dissertation by Dr.-Ing. Helmut Klausing, entitled "Implementability of a Radar Device Comprising a Synthetic Aperture by Means of Rotating Antennas", MBB-Publication, MBB-UA-1150-89-Pub=OTN-029299, 1989, disclose a radar device which has a transmitter and a receiver as well as an antenna for the transmitting and receiving of radar pulses. The antenna is arranged on the end of a rotating arm, for example, a rotating arm of a helicopter rotor or of a turnstile located above the rotor axis. A radar device of this type comprising a synthetic aperture on the basis of rotating antennas is called a ROSAR-device. The received signals are demodulated and are stored intermediately, and are then correlated with reference functions. These reference functions are calculated and preset based on the illumination geometry of the radar device.

The parameters for calculation and presetting of the reference functions are the distance intervals to be measured, the transmission frequency, the length of the rotating arm, the angle of rotation range of the antenna from which the signals are received back, the number of transmitted pulses, as well as the height of the rotating antenna above the ground. The correlation result will be appropriately displayed, for example, on a monitor.

A radar device of this type may be used in approximate real time in the on-line operation and, thus, can be used, for example, not only in the field of cartography, in obstacle warning operations or as a landing aid, but also for the purpose of target reconnaissance and target tracking. The processor of this known ROSAR-device has several modules in order to subdivide the multiple and complex computing tasks and therefore permit an on-line operation.

In this known apparatus, the result for each distance interval is always obtained by the correlation of the received signal with a reference function that is valid for this distance interval.

In German Patent document DE-PS 39 22 086, the problem of the resolution of a ROSAR-device is addressed only briefly, specifically only the so-called range curvature problem. The resolution of a ROSAR-device in the lateral and the radial direction is determined by parameters which are partially coupled with one another. These parameters include the wavelength $\gamma$ of the transmitted signal and the length L of the rotating antenna arm; the apex angle of the antenna $\gamma$; the distance $R_{GO}$ between the antenna and the center line of the illuminated strip; the height $H_O$ of the antenna above the ground; the pulse repeating frequency $f_p$ and the duration of the transmitted pulses, and therefore the number $Z_s$ of the pulses for each aperture length S; the duration $t_e$ of the received echo signals; and the scanning rate for the distance intervals, etc.

The lack of resolution of a ROSAR-device is caused by the changing distance to the scanned object during the integration period of the received signal. This has the result that the resolution cells or storage cells which are assigned to the individual distance intervals are curved. If the path difference $\Delta R_s$ in the radial direction caused by this curvature is equal to or larger than the dimension of the resolution cell (also in the radial direction $\Delta R_{Smin} = (c \cdot \tau)/2$) a point target is imaged in two adjacent or even in several adjacent resolution cells. That is, the point target is imaged in a blurred manner. The signal course of the received signal in the azimuth will then seem to be bent in a curve-type manner. With respect to the deviations, reference is made to the above-mentioned MBB-Publication, Pages 50 to 54.

There is therefore needed a ROSAR-device of the above-described type that minimizes the imaging defects.

This need is met according to the present invention, by a radar device comprising at least one transmitter and one receiver. The radar device has at least one antenna arranged for the transmitting and receiving of radar pulses on the end of a rotating arm. The radar device further comprises a device for demodulating and intermediately storing the received signals, including devices for forming and storing reference functions as a function of the illumination geometry of the radar device, the distance intervals to be measured, the angle of rotation ranges, the transmitted pulses as well as the height of the rotating antenna above ground. A processor circuit is provided for subdividing the distance range illuminated by the antenna into individual distance intervals, and for determining the reference functions in these distance intervals. A correlator correlates the received signals to the reference functions. A display device is provided for displaying the correlation result. The processor circuit comprises a comparator circuit for estimating the distortion of the stored distance intervals caused by the movement of the antenna. This circuit acts upon a further circuit for correcting the range curvature deviation.

Accordingly, the processor circuit is expanded by a comparator module in which an imaging defect is recognized. The imaging defect is caused because of the range curvature deviation. The remaining processor circuit then has access to an additional module for the range curvature correction so that a point target which is plurivalent per se is assigned to only one distance interval.

This additional module is used for the correction of the curvature of the stored distance intervals; that is, for the correction of the range curvature deviation. If the path error is larger than a specified threshold, preferably larger than half the required radial resolution, this additional module will then assign the received signal proportion to one or more adjacent distance intervals so that it will be correlated with the reference function which is valid there.

During the system design of the ROSAR, the maximal angle of rotation $\alpha_{RCmax}$ up to which the illumination of a target for a specified radial resolution $\Delta R_{Smin}$ may take place without the requirement of a correction must always be examined. A maximal path difference $\Delta R_{Smax}$ caused by the curvature, for example, half the length of the distance interval $\Delta R'_{Smin}$ is permitted. That is, a comparative value is considered as the maximal permitted path difference in the radial direction $\Delta R'_{Smin}$. This value may amount to, for example, half the radial resolution $\Delta R_{Smin}$.

FIG. 9 illustrates the illumination geometry of the curved resolution cells with the circular-ring-shaped distance intervals of the length $\Delta R_{Smin}$. The target is situated at a distance on the ground $R_{gn}$ from the pivot and at a distance $R_{SO}$ from the antenna at the angle of rotation $\alpha = 0°$. This is so that, for other angles of rotation $\alpha = \omega_o t$, deviations $\Delta R_S = (R_s - R_{SO})$ occur with respect to the curved synthetic aperture S.

The following will therefore apply: $\Delta R_{Smax} \leq \Delta R'_{Smin}$
with $$\Delta R'_{Smin} = \frac{\Delta R_{Smin}}{2} = \frac{c \cdot \tau}{4}.$$

As long as the slant-distance difference $\Delta R_{Smax}$ occurring at the edges of the synthetic aperture S is smaller than or equal to the specified comparative value $\Delta R'_{Smin}$, no correction must be made. However, when the maximal path difference $\Delta R_{Smax}$ exceeds the comparative value $\Delta R'_{Smin}$, a correction must take place.

The presetting of the device with half the radial resolution is not fixedly defined but may, depending on the required precision, also contain smaller limits. For this reason, an adapting factor F is generally introduced. The following will then be valid for the comparative value:

$$\Delta R'_{Smin} = \frac{\Delta R_{Smin}}{F} = \frac{c \cdot \tau}{2 \cdot F}.$$

This adapting factor F may, for example, be between 2 and 5.

The following applies to the maximal distance difference $\Delta R_{Smax}$:

$$\Delta R_{Smax} = \sqrt{L^2 + R_{gn}^2 - 2 \cdot L \cdot R_{gn} \cdot \cos(\alpha_S/2) + H_0^2} -$$

$$\sqrt{(R_{gn} - L)^2 + H_0^2}$$

with the angle of rotation range $\alpha_S$:

$$\alpha_S = \frac{S}{L} = \gamma \cdot \left(1 - \frac{L}{R_{gn}}\right).$$

wherein n is the number of the respective distance interval.

As long as the condition $\Delta R_{Smax} \leq \Delta R'_{Smin}$ is met, no correction has to be made.

A good approximation for the maximal path difference $\Delta R_{Smax}$ caused by the curvature is obtained for the instance where the distance $R_{gn}$ is large with respect to the rotor blade length L and the height above the ground $H_0$, at:

$$\Delta \tilde{R}_{Smax} = L \cdot \left(1 - \cos\left(\frac{\tilde{\alpha}_S}{2}\right)\right) = L \cdot \left(1 - \cos\left(\frac{\gamma}{2}\right)\right)$$

with $\tilde{\alpha}_S = \gamma$.

Other objects, advantages and novel features of the present invention will become apparent from the following detailed description of the invention when considered in conjunction with the accompanying drawings.

DETAILED DESCRIPTION OF THE DRAWINGS

Figure 1:
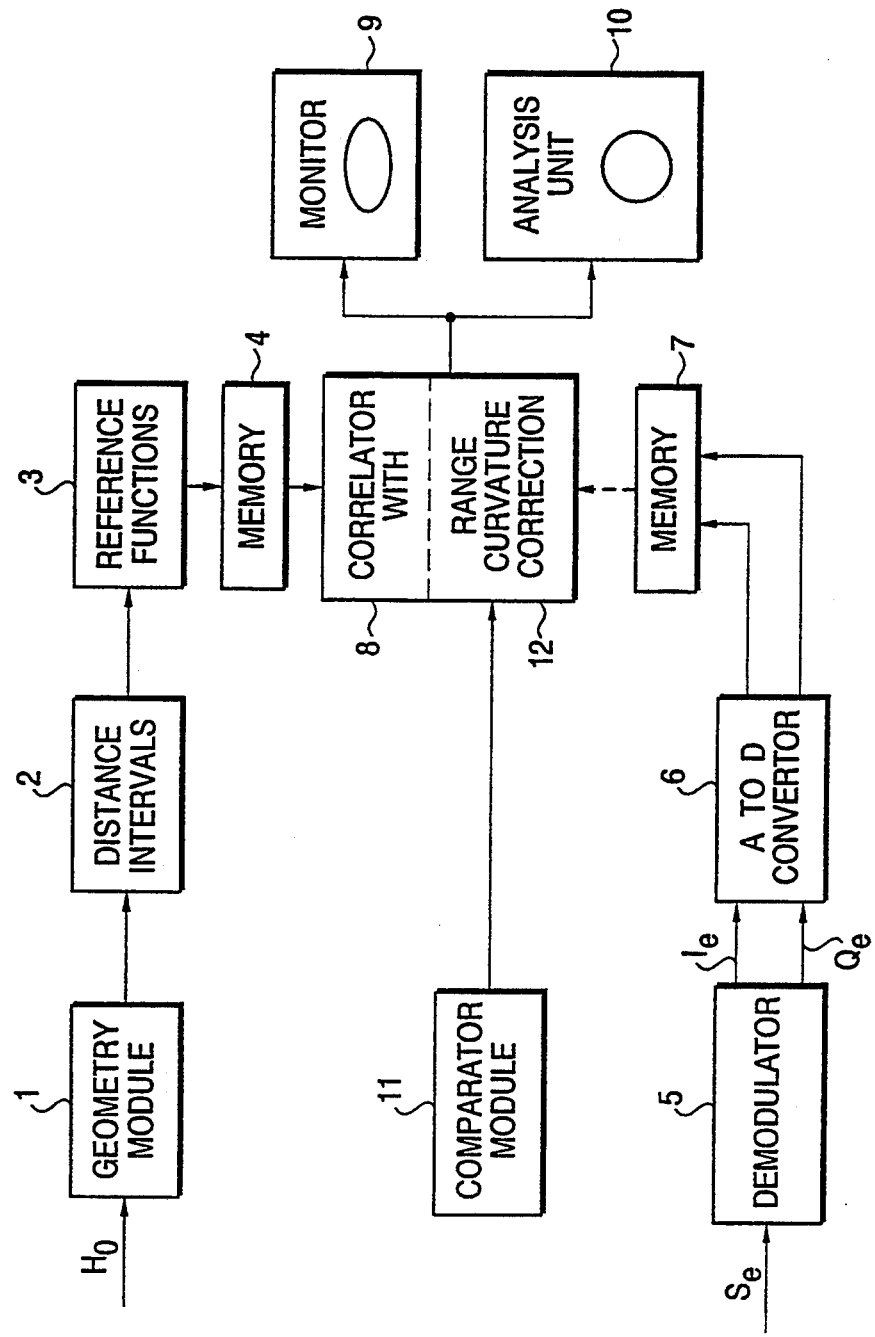
FIG. 1 is a schematic block diagram of a processor of a ROSAR-device according to the present invention.

FIG. 1 is a diagram of a processor for a ROSAR-device, in which, in the upper half of the block diagram, corresponding to a first channel, those modules are shown which are required for generating the reference functions. In the lower half, corresponding to a second channel, those modules are shown which are used for receiving the signals reflected on the ground.

In the first channel, a geometry module 1 is provided. The geometry module 1, by means of the height $H_0$ of the antenna above the ground and other parameters, particularly the depression angle, the inclination angle and the length of the rotor arm, calculates various quantities and functions which are fed to a processor circuit 2 for dividing the illuminated area into individual distance intervals. This processor circuit 2 is connected with a processor module 3 in which, by means of the output signals of the processor circuit 2, the reference functions are calculated for the individual distance intervals. The reference functions required for the correlation are then transferred into a memory 4.

In the second channel, the echo signals $S_e$ are fed to a quadrature demodulator 5 and are divided into the in-phase component $I_e$ and the quadrature component $Q_e$. The two components are fed to analog-to-digital converters 6, at whose output discrete scanning values will then be present. These complex echo signals will then be transferred to a memory 7 for the correlation. In this memory 7, the received signals $S_E$ for the respective distance intervals are composed from the echo signals pertaining to these intervals. The signals, which are filed in memories 4 and 7 respectively, are synchronously fed to a correlator 8 and are correlated. The correlation result is displayed on a display, such as a monitor 9 and/or is then fed to an analysis unit 10.

For a more detailed description with respect to the distribution of the reference functions to individual distance intervals and their calculation, which is not required here to understand the present invention, reference is made to the above-mentioned German Patent Document DE-PS 39 22 086.

In addition to the described processor modules, a comparator module 11 and a processor circuit 12 are provided for the correction of the range curvature deviation. This comparator module 11 compares the maximal path difference $\Delta R_{max}$ with the comparative value $\Delta R'_{Smin}$. When the path error caused by the range curvature is larger than a defined threshold, the module 11 accesses the processor circuit 12 for the range curvature correction and there displaces the corresponding received signals such that a correlation takes place with reference functions from adjacent distance intervals, that is, distance intervals which are removed approximately by the path error. The range curvature error is therefore compensated. For the reduction of the computing expenditures, the range curvature corrections are carried out within the framework of the correlation process. For example, if the correlation takes place in the frequency range, a range curvature correction takes place after the Fourier transform of the respective received signals; that is, still before the multiplication with the fourier-transformed reference functions and the subsequent inverse transformation into the time range.

Figure 2:
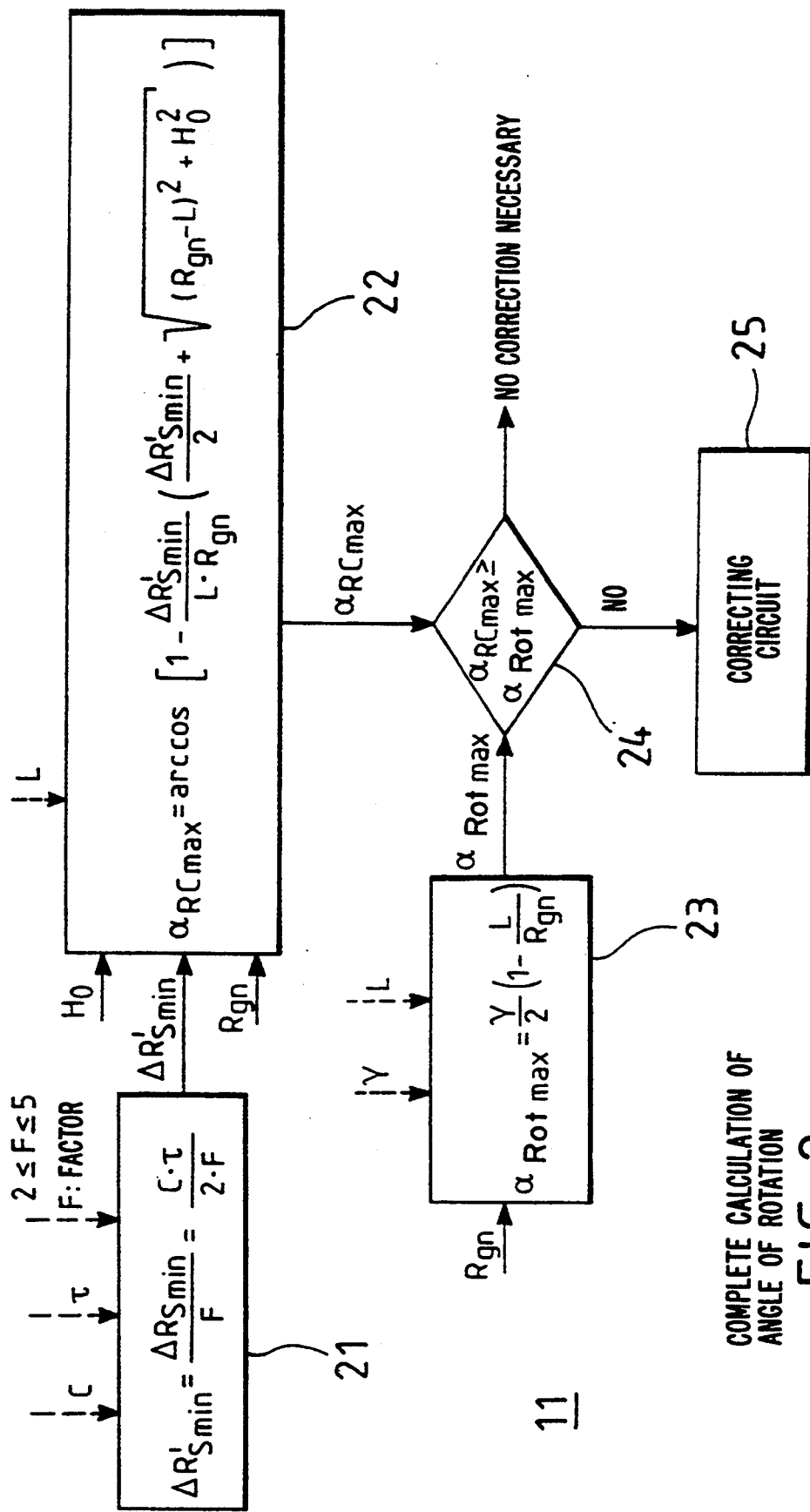
FIG. 2 is a block diagram of a comparator circuit for determining a path error caused by the range curvature and for determining the maximally permissible angle of rotation $\alpha_{RCmax}$, for which correction is not required.

The calculation of the maximal angle of rotation up to which no correction is required (or starting from which a correction is required) takes place in module 11 whose circuit is illustrated in FIG. 2. By means of the input quantities light velocity c, transmitted pulse duration $\tau$ and the above-mentioned adapting factor F, the comparative value $\Delta R'_{Smin}$ $$\Delta R'_{Smin} = \frac{c \cdot \tau}{2 \cdot F}$$

is calculated in a module 21. By means of this result and with the aid of the height $H_0$ above the ground, the respective distance interval $R_{gn}$ and the rotor length L of the arm carrying the antenna, the maximally permissible angle of rotation $\alpha_{RCmax}$ for which no correction is yet required is calculated in a computer module 22 according to the following formula:

$$\alpha_{RCmax} = \arccos\left(1 - \frac{\Delta R'_{Smin}}{L \cdot R_{gn}} \cdot \left(\frac{\Delta R'_{Smin}}{2} + \sqrt{(R_{gn} - L)^2 + H_0^2}\right)\right).$$

In another module 23, the actual maximal angle of rotation $$\alpha_{Drehmax} = \frac{\gamma}{2} \cdot \left(1 - \frac{L}{R_{gn}}\right)$$

is calculated from $R_{gn}$, L and the apex angle $\gamma$ of the antenna in the azimuth and is compared in a comparator 24 with $\alpha_{RCmax}$. If $\alpha_{RCmax}$ is larger, no-correction is necessary. If it is smaller, a correction takes place in a correcting circuit 25 in which the angle of rotation is completely calculated and the module 12 is correspondingly accessed.

Figure 3:
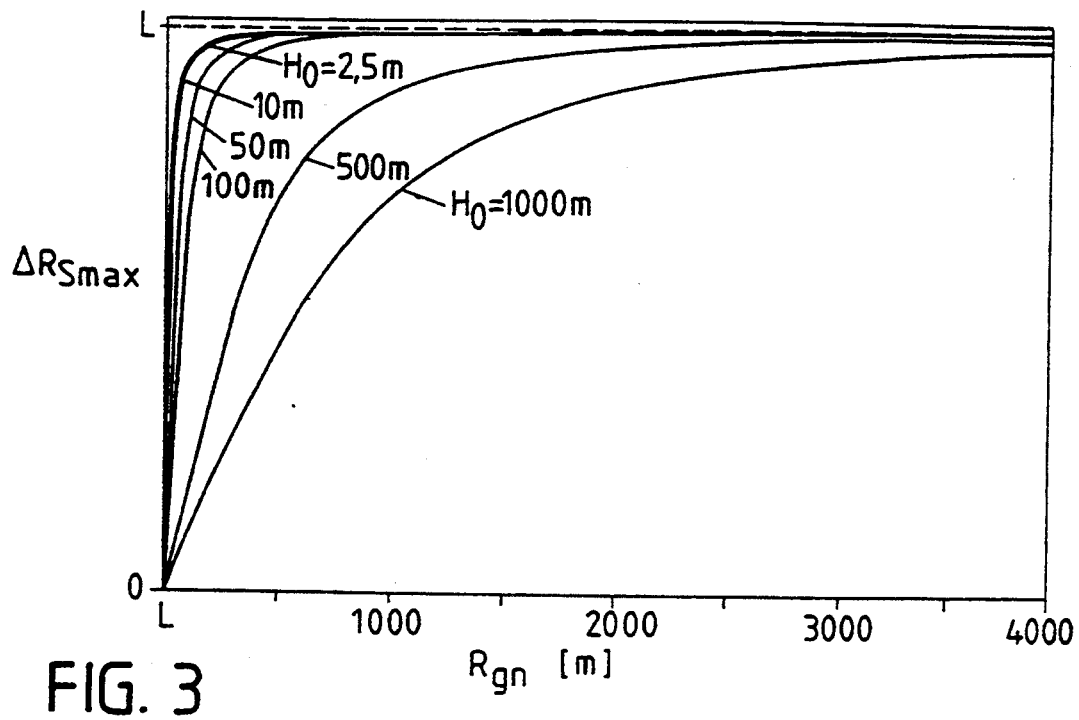
FIG. 3 is a diagram of the course of the maximal distance difference $\Delta R_{Smax}$.
Figure 4:
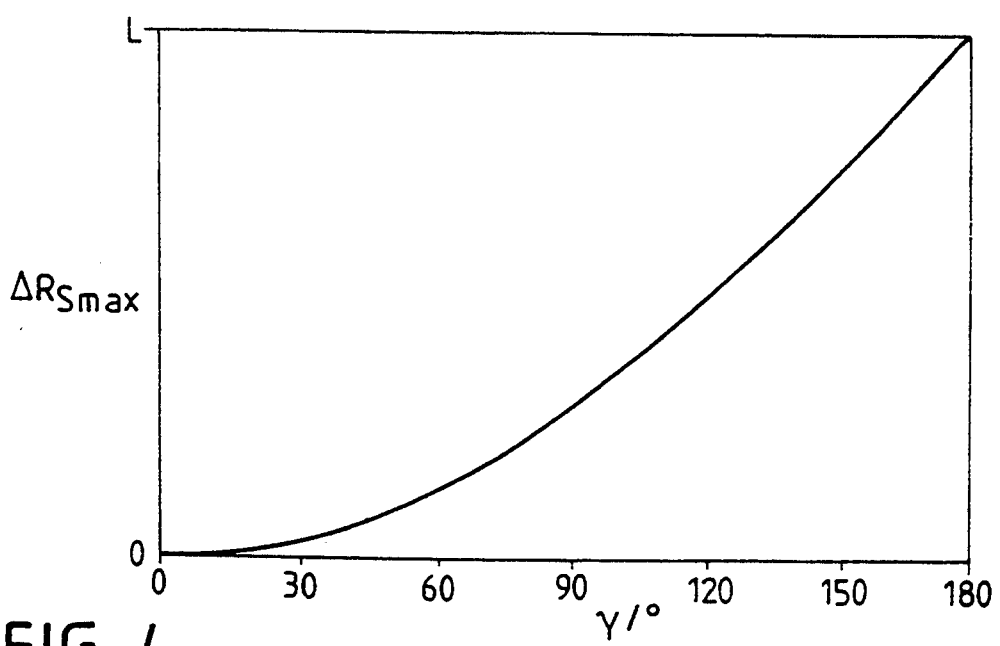
FIG. 4 is a diagram of the course of the maximal distance difference $\Delta R_{Smax}$.
Figure 5:
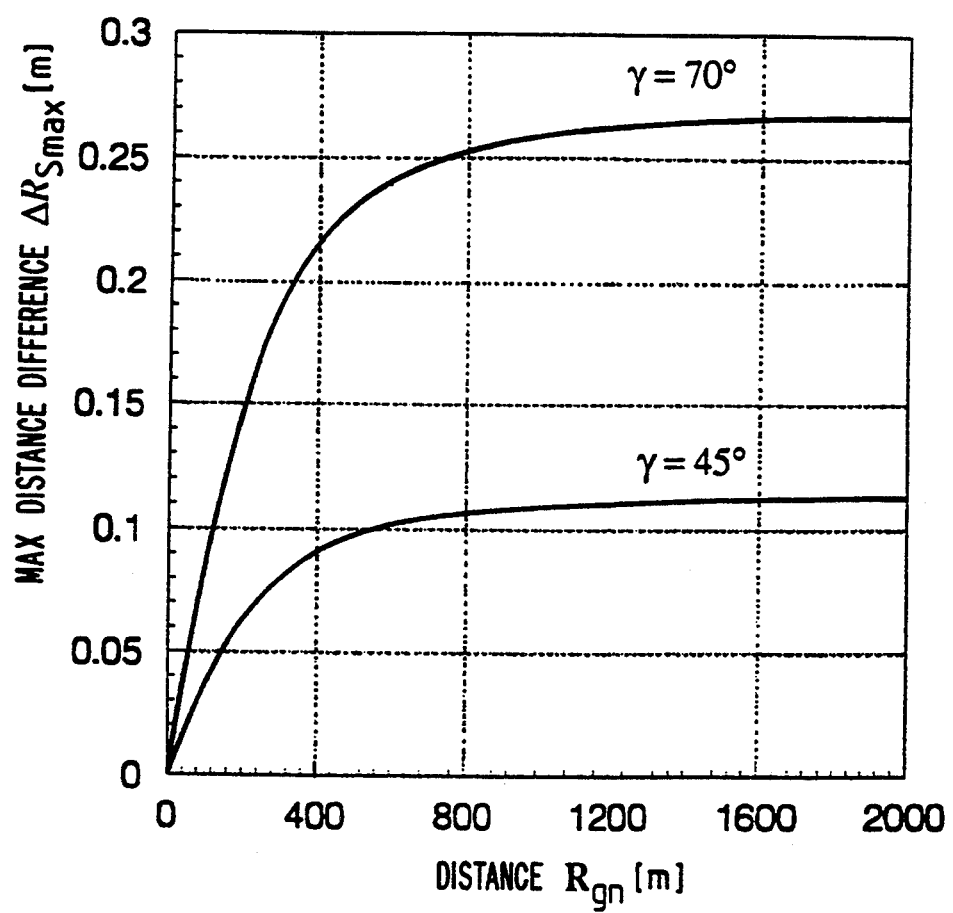
FIG. 5 is a diagram of the course of the maximal distance difference $\Delta R_{Smax}$ for an actual helicopter configuration with a turnstile of the length L above the rotor axis ($H_0 = 300$ m, $L = 1.5$ m), for an apex angle of the antenna in the azimuth $\gamma$ of 45° and 70° as a function of the distance $R_{gn}$.
Figure 6:
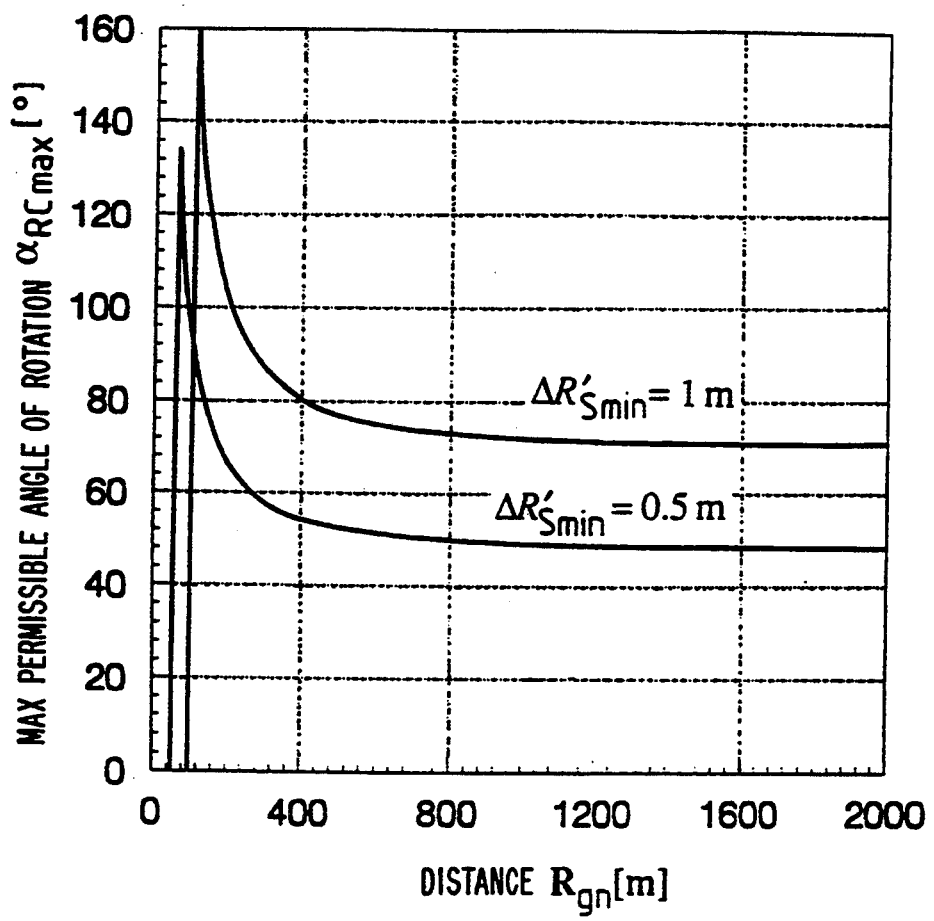
FIG. 6 is a diagram of the course of the maximal permissible angle of rotation $\alpha_{RCmax}$ for an actual helicopter configuration with a turnstile of length L above the rotor axis ($H_0 = 300$ m, $L = 1.5$ m) with a comparative value $\Delta R'_{Smin}$ of 0.5 m and 1.0 m as a function of the distance $R_{gn}$.

FIGS. 3, 4 and 5 illustrate the course of the maximal deviation $\Delta R_{Smax}$ as a function of the distance on the ground $R_{gn}$ and, with the height $H_0$ above the ground as a parameter. (FIG. 3), with the apex angle $\gamma$ as a parameter (FIG. 4) or as a function of the apex angle $\gamma$ (FIG. 5). Accordingly, the maximally possible deviation at $\gamma = 180°$ is approximately one rotor length L. In FIG. 6, the maximally permissible angle of rotation $\alpha_{RC\ max}$ is entered above the distance $R_{gn}$ with $\Delta R'_{Smin}$ as a parameter. For the diagrams of FIG. 5 and FIG. 6, $H_0 = 300$ m and $L = 1.5$ m.

Figure 7:
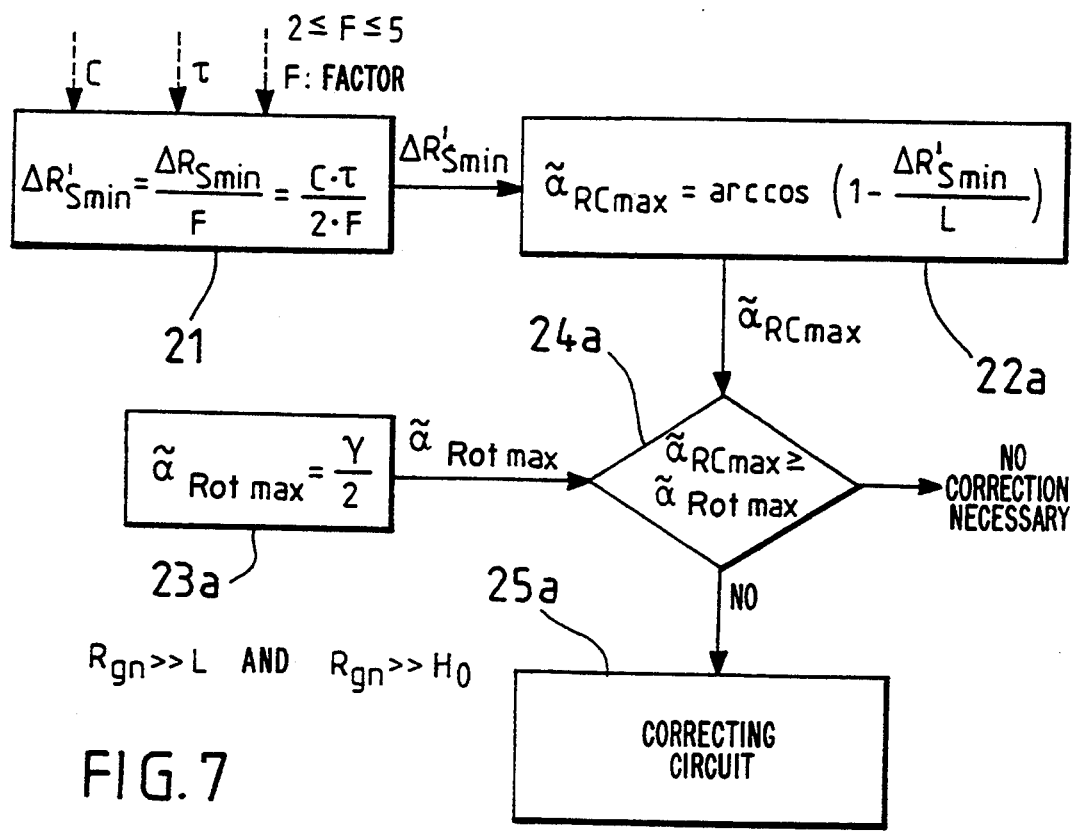
FIG. 7 is a block diagram of a simplified comparator circuit for determining a path error caused by the range curvature and for determining the maximal permissible angle of rotation $\tilde{\alpha}_{RCmax}$, for which correction is not necessary.

In addition to the above-indicated complete solution for the calculation of the angle of rotation, if $R_{gn}$ is large with respect to the rotor blade length L and the height above the ground $H_0$, an estimation according to FIG. 7 will be sufficient. As in the case of the circuit according to FIG. 2, the comparative value $\Delta R'_{smin}$ is calculated in module 21. In a module 22a, the estimated value for the angle of rotation $$\tilde{\alpha}_{RCmax} = \arccos\left(1 - \frac{\Delta R'_{Smin}}{L}\right)$$

is formed and is compared with the approximated value for the actual maximal angle of rotation from module 23a $$\tilde{\alpha}_{Drehmax} = \frac{\gamma}{2}$$

in a comparator 24a. If the estimated value $\tilde{\alpha}_{RC\ max}$ is equal to or larger than $\tilde{\alpha}_{Drehmax}$, no correction is required. If it is smaller, a correction takes place by means of a simple, preferably hardwired circuit 25a.

The circuits according to FIGS. 2 and 7 exist next to one another. The simple circuit according to FIG. 7 is used preferably and a switch-over to the circuit according to FIG. 2 does not take place before a complete solution is required.

Figures 8A, 8B:
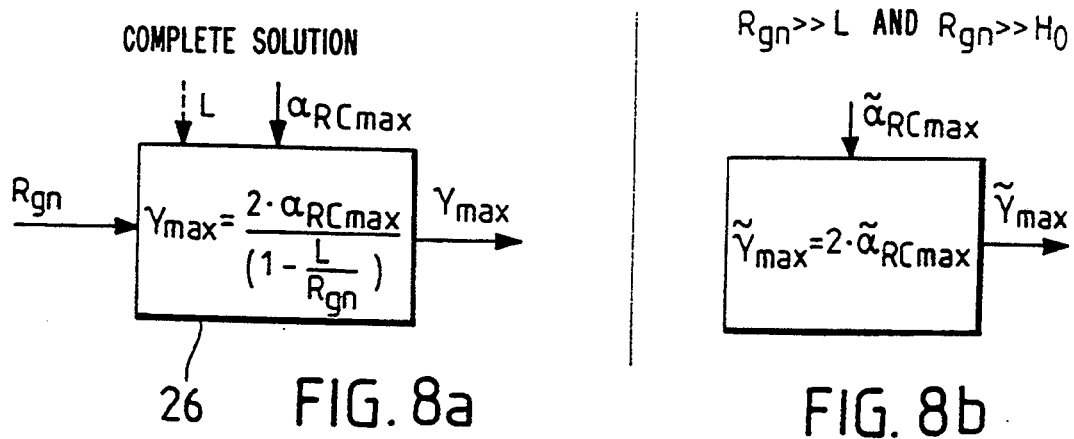
FIGS. 8a and 8b are two block diagrams for the calculation of the maximal apex angle of the antenna in the azimuth $\gamma_{max}$ without requiring a range curvature correction.
Figure 9:
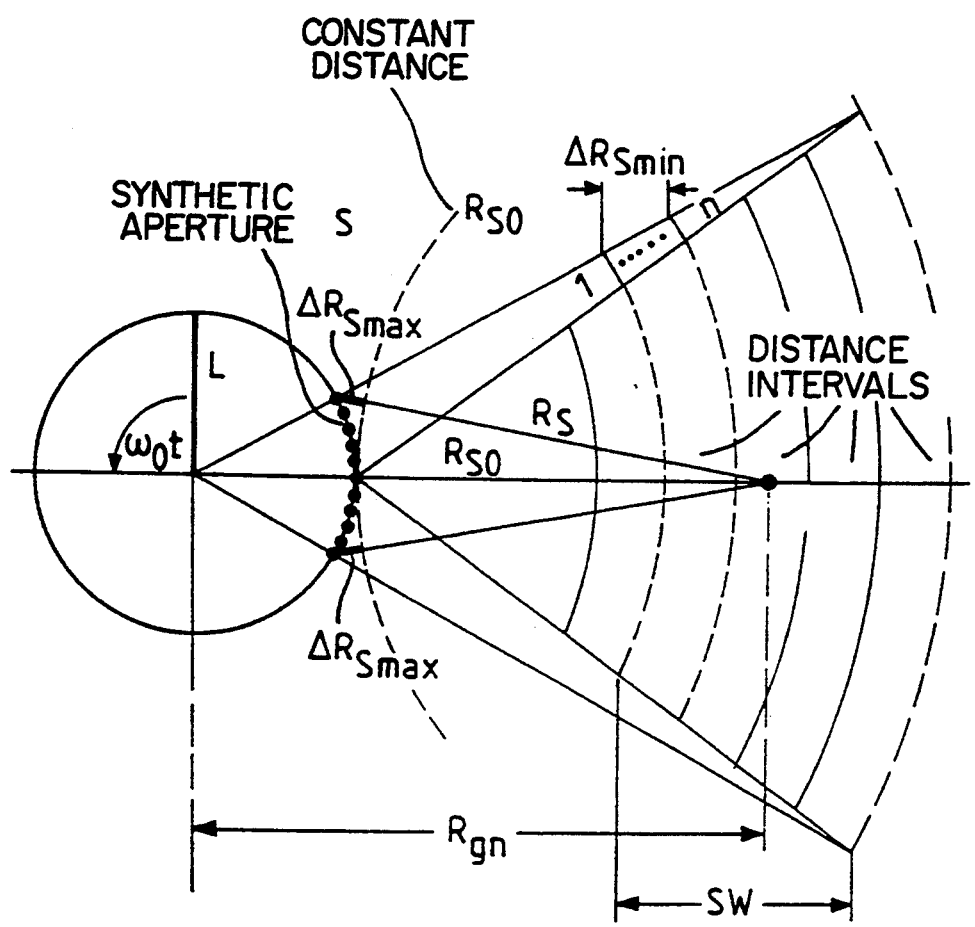
FIG. 9 is a diagramtic view of the illumination geometry with the circular-ring-shaped distance intervals.

The calculation of the maximal apex angle of the antenna in the azimuth $\gamma_{max}$ without the requirement of a range curvature correction takes place in a circuit according to FIGS. 8a and 8b. From the maximally permissible angle of rotation $\alpha_{RCmax}$ at which a correction is barely not yet necessary, the pertaining apex angle $\gamma_{max}$ can then be calculated. The following applies (FIG. 8a):

$$\gamma_{max} = \frac{2 \cdot \alpha_{RCmax}}{\left(1 - \frac{L}{R_{gn}}\right)}.$$

For the distances $R_{gn}$ which are large with respect to the rotor length L and the height $H_0$, the following will apply (FIG. 8b): $\tilde{\gamma}_{max} = 2 \cdot \tilde{\alpha}_{RCmax}$ As long as these conditions are met, no range curvature correction has to be carried out.

The correlation will be explained by means of two examples:

Example 1. For $\gamma=70°$, $L=1.5$ m, $\Delta R_{Smin}=1.0$ m, $F=2$, the following is obtained with $\Delta R'_{Smin}/2=0.5$ m for the maximally permissible angle of rotation $\tilde{\alpha}_{RCmax}$, for which no correction is yet required:

$$\tilde{\alpha}_{RCmax} = \arccos\left(1 - \frac{\Delta R'_{Smin}}{L}\right) \approx 48.2°.$$

This results in the maximally permissible apex angle $\tilde{\gamma}_{max}$ of $\tilde{\gamma}_{max}=2\cdot\tilde{\alpha}_{RCmax}=96.4°$.

Since the value for $\gamma$ was specified to be 70°, but the maximal apex angle without the requirement of a correction $\tilde{\gamma}_{max}$ may be 96.4°, a correction does not have to take place.

Example 2. For $\gamma=70°$, $L=1.5$ m, $\Delta R_{Smin}=0.3$ m, $F=2$, the following is obtained with $\Delta R'_{Smin}=\Delta R_{Smin}/2=0.15$ m for the maximally permissible angle of rotation $\tilde{\alpha}_{RCmax}$, for which no correction is yet required:

$$\tilde{\alpha}_{RCmax} = \arccos\left(1 - \frac{\Delta R'_{Smin}}{L}\right) \approx 25.8°.$$

This results in the maximally permissible apex angle $\tilde{\gamma}_{max}$ of $\tilde{\gamma}_{max}=2\cdot\tilde{\alpha}_{RCmax}=51.6°$.

Since the value for $\gamma$ was specified to be 70°, but the maximal apex angle without the requirement of a correction $\gamma_{max}$ may only be 51.6°, a correction must take place.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A radar device, comprising:
   at least one transmitter;
   at least one receiver;
   at least one antenna for transmitting and receiving radar pulses, said antenna being operatively arranged on an end of a rotating arm;
   a first device demodulating and intermediately storing received signals;
   a second device for forming and storing reference functions based on predetermined system parameters;
   a processor circuit for subdividing a distance range illuminated by said antenna into individual distance intervals, and for determining reference functions in said individual distance intervals;
   a correlator for correlating said received signals to said reference functions to provide a correlation result; and
   and output device for said correlation result;
   wherein said processor circuit comprises a comparator circuit for estimating a distortion error of stored distance intervals caused by movement of said antenna, said comparator circuit accessing a range curvature correction circuit for correcting a range curvature deviation.

2. A radar device according to claim 1, wherein said predetermined system parameters comprise at least one of:
   illumination geometry of said radar device, distance intervals to be measured, angle of rotation ranges, transmitted radar pulses, and height of said antenna above ground.

3. A radar device according to claim 2, wherein said output device is a display device.

4. A radar device according to claim 1, wherein said comparator circuit causes a correlation of the received signal in an adjacent distance interval, when the distortion error is larger than a specified threshold ($\Delta R'_{Smin}$) value, particularly larger than half the required radial resolution ($\Delta R_{Smin}$).

5. A radar device according to claim 4, wherein said comparator circuit compares the specified threshold ($\Delta R'_{Smin}$) value with a maximally occurring deviation ($\Delta R_{Smax}$), and in that the output of said comparator circuit accesses said range curvature correction circuit for the correction of the range curvature deviation and therefore shifts the received signals from the momentarily processed distance interval into a single adjacent or several adjacent distance intervals.

6. A radar device according to claim 5, wherein said comparator circuit compares the difference of the distances between the target and the arc of the synthetic aperture in the case of an angle of rotation of the antenna of 0° or the maximally permissible angle of rotation.

7. A radar device according to claim 1, wherein said comparator circuit has a first computing circuit in which the maximally permissible angle of rotation ($\alpha_{RCmax}$) of the antenna up to which no correction is required and the actual maximal angle of rotation ($\alpha_{Drehmax}$) are calculated, said maximally permissible angle of rotation and said actual maximal angle of rotation being compared with one another in a comparator, and a correcting circuit is activated when the actual angle of rotation is larger than the maximally permissible one.

8. A radar device according to claim 4, wherein said comparator circuit has a first computing circuit in which the maximally permissible angle of rotation ($\alpha_{RCmax}$) of the antenna up to which no correction is required and the actual maximal angle of rotation ($\alpha_{Drehmax}$) are calculated, said maximally permissible angle of rotation and said actual maximal angle of rotation being compared with one another in a comparator, and a correcting circuit is activated when the actual angle of rotation is larger than the maximally permissible one.

9. A radar device according to claim 5, wherein said comparator circuit has a first computing circuit in which the maximally permissible angle of rotation ($\alpha_{RCmax}$) of the antenna up to which no correction is required and the actual maximal angle of rotation ($\alpha_{Drehmax}$) are calculated, said maximally permissible angle of rotation and said actual maximal angle of rotation being compared with one another in a comparator, and a correcting circuit is activated when the actual angle of rotation is larger than the maximally permissible one.

10. A radar device according to claim 7, wherein in said correcting circuit, a maximal apex angle ($\gamma_{max}$) of the antenna in the azimuth, for which no correction is yet required, is calculated completely at:

$$\gamma_{max} = \frac{2 \cdot \alpha_{RCmax}}{\left(1 - \frac{L}{R_{gn}}\right)}$$

with $\alpha_{RCmax}$ being the actual maximal angle of rotation without the requirement of a correction, and in that in the case of larger apex angles, a correction will take place.

11. For use in a radar device, comprising:
at least one transmitter;
at least one receiver;
at least one antenna for transmitting and receiving radar pulses, said antenna being operatively arranged on an end of a rotating arm;
a first device demodulating and intermediately storing received signals;
a second device for forming and storing reference functions based on predetermined system parameters;
a processor circuit for subdividing a distance range illuminated by said antenna into individual distance intervals, and for determining reference functions in said individual distance intervals;
a correlator for correlating said received signals to said reference functions to provide a correlation result; and
an output device for said correlation result;
wherein said processor circuit comprises a comparator circuit for estimating a distortion error of stored distance intervals caused by movement of said antenna, said comparator circuit accessing a range curvature correction circuit for correcting a range curvature deviation;
a process comprising the steps of:
forming an estimated value ($\tilde{\alpha}_{RCmax}$) for the maximally permissible angle of rotation in a second computer circuit when the distance on the ground ($R_{gn}$) between the pivot and the just illuminated target is significantly larger than the rotor length (L) of the rotating arm carrying the antenna and the height ($H_0$) of the antenna above the ground;
comparing said estimated value with half the apex angle ($\gamma/2$) of the antenna in the azimuth; and
activating said correcting circuit when half the apex angle is larger than the estimated value.

12. A process according to claim 11, wherein in the comparator circuit, the second computing circuit is activated first and a switch-over to the first computing circuit will not take place until when the distance on the ground ($R_{gn}$) is no longer significantly larger than the rotor length (L) and the height ($H_0$).

* * * * *